(12) United States Patent
Fu et al.

(10) Patent No.: US 7,973,876 B2
(45) Date of Patent: Jul. 5, 2011

(54) BACKLIGHT MODULE HAVING FRAME ACCOMMODATING LIGHT SOURCE DRIVER AND LIQUID CRYSTAL DISPLAY USING SAME

(75) Inventors: Zhi-feng Fu, Shenzhen (CN); Yu-Liang Huang, Miao-Li (TW); Ke Lin, Shenzhen (CN)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 407 days.

(21) Appl. No.: 12/069,802

(22) Filed: Feb. 12, 2008

(65) Prior Publication Data
US 2008/0192170 A1   Aug. 14, 2008

(30) Foreign Application Priority Data
Feb. 12, 2007   (TW) .............................. 96104979 A

(51) Int. Cl.
*G02F 1/1333*   (2006.01)
*G02F 1/1335*   (2006.01)
*G02F 1/1345*   (2006.01)
(52) U.S. Cl. .............................. 349/61; 349/58; 349/150
(58) Field of Classification Search .................... 349/58, 349/61, 150
See application file for complete search history.

(56) References Cited

U.S. PATENT DOCUMENTS

| 7,374,435 | B2 * | 5/2008 | Idenishi | 439/77 |
| 2004/0252254 | A1 * | 12/2004 | Koo et al. | 349/58 |
| 2006/0125981 | A1 * | 6/2006 | Okuda | 349/110 |
| 2006/0152944 | A1 | 7/2006 | Nakayoshi et al. | |
| 2006/0164858 | A1 | 7/2006 | Park et al. | |
| 2006/0187373 | A1 | 8/2006 | Hu | |
| 2006/0209227 | A1 * | 9/2006 | Miyamoto | 349/58 |
| 2006/0267918 | A1 * | 11/2006 | Kim | 345/102 |
| 2007/0126654 | A1 * | 6/2007 | Choi et al. | 345/1.1 |

FOREIGN PATENT DOCUMENTS

| CN | 2785066 Y | 5/2006 |
| CN | 1797090 A | 7/2006 |
| CN | 1862325 A | 11/2006 |
| TW | 200509782 A | 3/2005 |
| TW | 200638144 A | 11/2006 |

* cited by examiner

*Primary Examiner* — Nathanael R Briggs
(74) *Attorney, Agent, or Firm* — Wei Te Chung

(57) ABSTRACT

An exemplary backlight module (2) includes a light guide plate (23), a light source (25), a light source driver (27), and a frame (21). The light source is provided adjacent to the light guide plate. The light source driver is directly connected with the light source. The frame includes an upper frame (211) and a lower frame (212). The upper frame and the lower frame cooperatively form a space to accommodate the light guide plate, the light source, and the light source driver.

4 Claims, 6 Drawing Sheets

BACKLIGHT MODULE HAVING FRAME ACCOMMODATING LIGHT SOURCE DRIVER AND LIQUID CRYSTAL DISPLAY USING SAME

CROSS-REFERENCE TO RELATED APPLICATION

This application is related to, and claims the benefit of, a foreign priority application filed in Taiwan as Ser. No. 96104979 on Feb. 12, 2007. The related application is incorporated herein by reference.

FIELD OF THE INVENTION

The present invention relates to backlight modules and liquid crystal displays using the backlight modules.

GENERAL BACKGROUND

Liquid crystal displays are commonly used as display devices for compact electronic apparatuses. This is because they not only provide good quality images but also are very thin. Because liquid crystal molecules in a liquid crystal display do not emit any light themselves, the liquid crystal molecules have to be lit by a backlight module so as to clearly and sharply display text and images.

Referring to FIG. 5, a typical liquid crystal display 5 includes a bezel 51, a liquid crystal panel 52 and a backlight module 6 facing the liquid crystal panel 52. The bezel 51 includes an upper bezel 511 and lower bezel 512. The upper bezel 511 and the lower bezel 512 cooperatively form a space to accommodate the backlight module 6 and the liquid crystal panel 52.

Referring to FIG. 6, the backlight module 6 includes a frame 61, a reflective film 62, a light guide plate 63, a diffusion film 64, a light source 65, two connectors 66, a light source driver 67, and an input circuit 68. The frame 61 includes an upper frame 611 and a lower frame 612 which cooperatively form a space for accommodating the reflective film 62, the light guide plate 63, the diffusion film 64, and the light source 65. The light source 65 can be a cold cathode fluorescent lamp. The reflective film 62, the light guide plate 63, the diffusion film 64 are arranged in that order from bottom to top. The light source 65 is disposed adjacent to the light guide plate 63.

Each connector 66 includes a male connector (not labeled) and a female connector (not labeled). The female connector includes a cover casing (not labeled), an insulating body (not shown), signal terminals (not shown) and staggered terminals (not shown). The staggered terminals enables the connector 66 to achieve the objective of electrical conduction. The male connector includes a plurality of ribs (not shown) having a guide positioning function. The female connector defines a plurality of clasp grooves (not shown) corresponding to the ribs of the male connector. Thus, the light source driver 67 is electrically connected with the light source 65 via one of the connectors 66, and is electrically connected with the input circuit 68 via the other connector 66. And the connectors 66, the light source driver 67, and the input circuit 68 are disposed outside of the frame 61.

When the liquid crystal display 5 starts to work, the input circuit 68 provides a driving signal to the light source 65 via the connectors 66, and the light source driver 67. Light beams emitted from the light source 65 enter the light guide plate 63, and penetrate in the light guide plate 63. A majority of the light beams emit out upwardly. A minority of the light beams reach the reflective film 62. These light beams are reflected by the reflective film 62 and are utilized again. Then, light beams transmit through the diffusion film 64 and become uniform.

However, the liquid crystal display 5 need the two connectors 66 to electrically connect the light source driver 67, the light source 65 and the input circuit 68. This makes an assembling process of the liquid crystal display 5 complicated, and a cost thereof is high. Furthermore, because the connectors 66, the light source driver 67 and the input circuit 68 are disposed outside the frame 61, electrical connection therebetween is not reliable.

What is needed, therefore, is a backlight module that can overcome the above-described deficiencies. What is also needed, is a liquid crystal display including such backlight module.

SUMMARY

In one preferred embodiment, a backlight module includes a light guide plate, a light source, a light source driver and a frame. The light source is provided adjacent to the light guide plate. The light source driver is directly connected with the light source. The frame includes an upper frame and a lower frame. The upper frame and the lower frame cooperatively form a space to accommodate the light guide plate, the light source and the light source driver.

Other novel features, advantages and aspects will become more apparent from the following detailed description when taken in conjunction with the accompanying drawings.

DETAILED DESCRIPTION OF PREFERRED EMBODIMENTS

Reference will now be made to the drawings to describe the preferred embodiments in detail.

Figure 1:
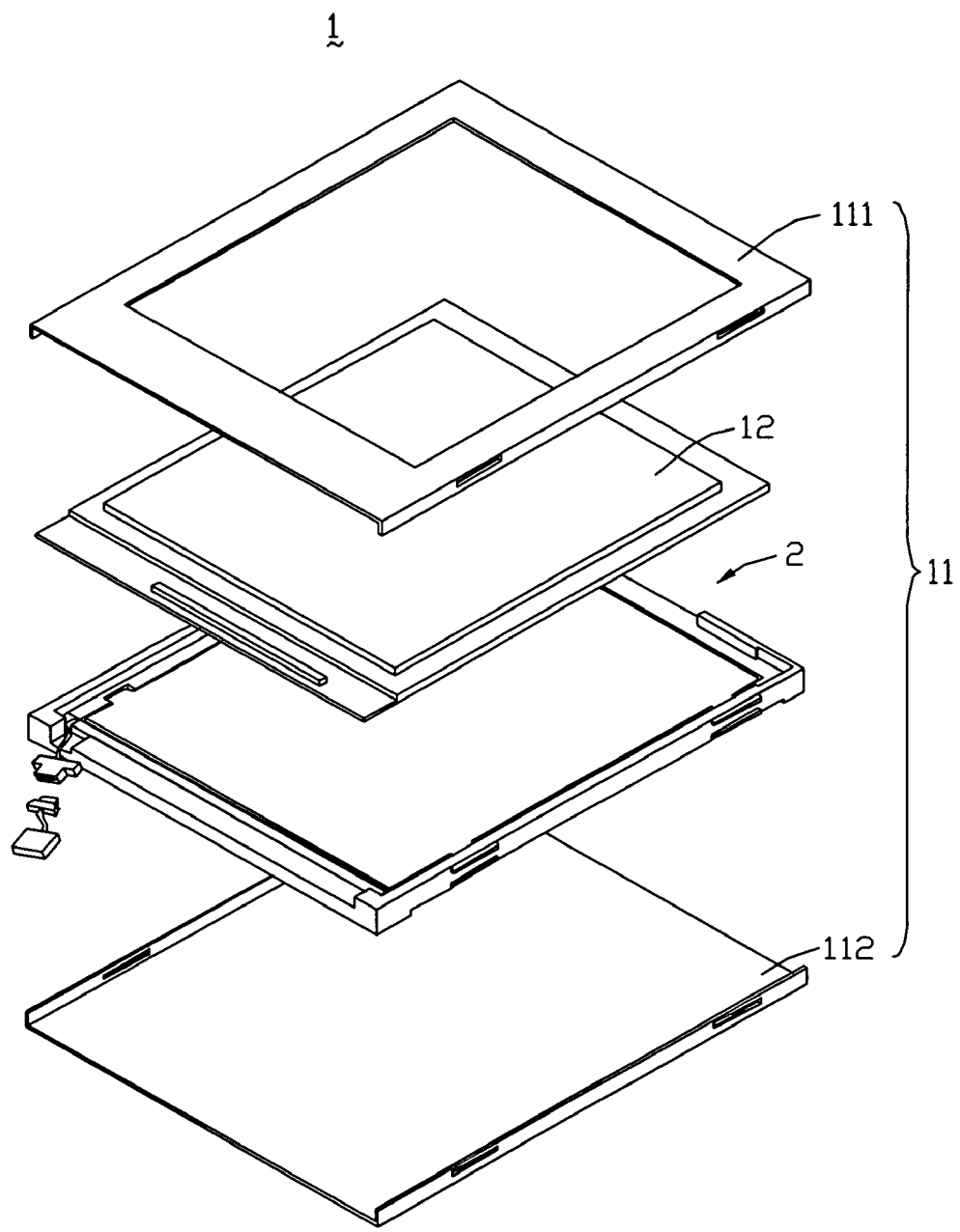
FIG. 1 is an exploded, isometric view of a liquid crystal display according to a first embodiment of the present invention, the liquid crystal display including a backlight module.

Referring to FIG. 1, a liquid crystal display 1 according to a first embodiment of the present invention is shown. The liquid crystal display 1 includes the backlight module 2, a liquid crystal panel 12 facing the backlight module 2 and a bezel 11. The bezel 11 includes an upper bezel 111 and a lower bezel 112 which cooperatively form a space to accommodate the liquid crystal panel 12 and the backlight module 2.

Figure 2:
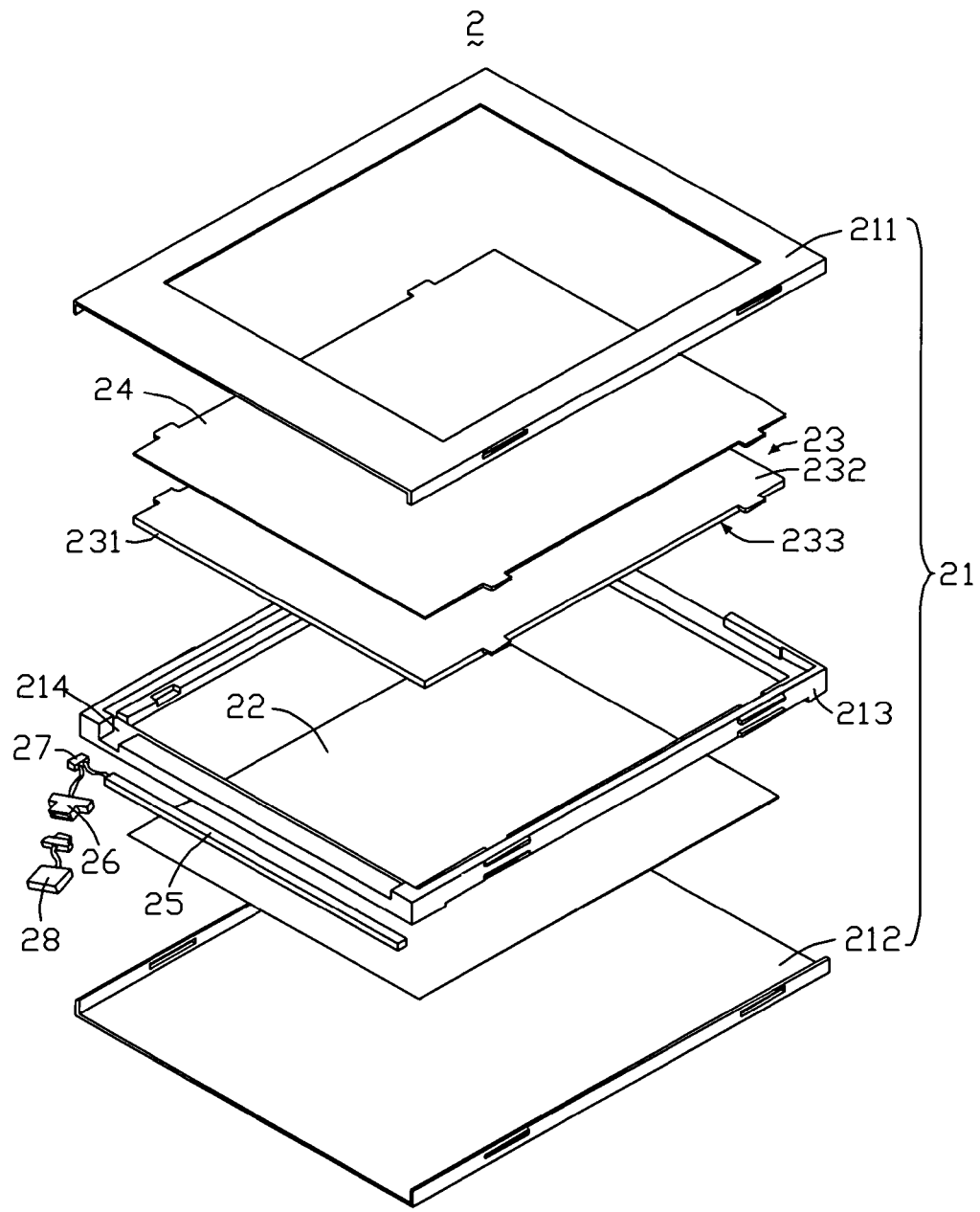
FIG. 2 is an exploded, isometric view of the backlight module of FIG. 1.

Referring also to FIG. 2, the backlight module 2 includes a frame 21, a reflective film 22, a light guide plate 23, a diffusion film 24, a light source 25, a light source driver 27, a connector 26 and an input circuit 28. The frame 21 includes an upper frame 211, a lower frame 212 and a plastic frame 213 which cooperatively form a space to accommodate the reflective film 22, the light guide plate 23, the diffusion film 24, the light source 25 and the light source driver 27. The light source 25 can be a cold cathode fluorescent lamp. The light guide plate 23 includes a light incident surface 231, a light emitting surface 232 perpendicularly adjoining the light incident surface 231, and a bottom surface 233 opposite to the light emitting surface 232. The reflective film 22 is disposed below the bottom surface 233, the diffusion film 24 is disposed on the light emitting surface 232, and the light source 25 is disposed adjacent to the light incident surface 231.

The light source driver 27 is electrically connected with the light source 25. The light source 25 is disposed adjacent to the light guide plate 23, and is received in the plastic frame 213. The plastic frame 213 further defines a concave 214 to receive the light source driver 27. The input circuit 28 is electrically connected with the light source driver 27 via the connector 26. The connector 26 and the input circuit 28 are placed outside the frame 21.

When the liquid crystal display 1 starts to work, the input circuit 28 generates a driving signal, and outputs the driving signal to the light source driver 27 via the connector 26. Then, the light source driver 27 applies the driving signal to the light source 25 to drive the light source 25. Light beams emitted by the light source 25 enter the light guide plate 23, and penetrate in the light guide plate 23. A majority of the light beams emit out upwardly. A minority of the light beams reach the reflective film 22. These light beams are reflected by the reflective film 22 and are utilized again.

Figure 3:
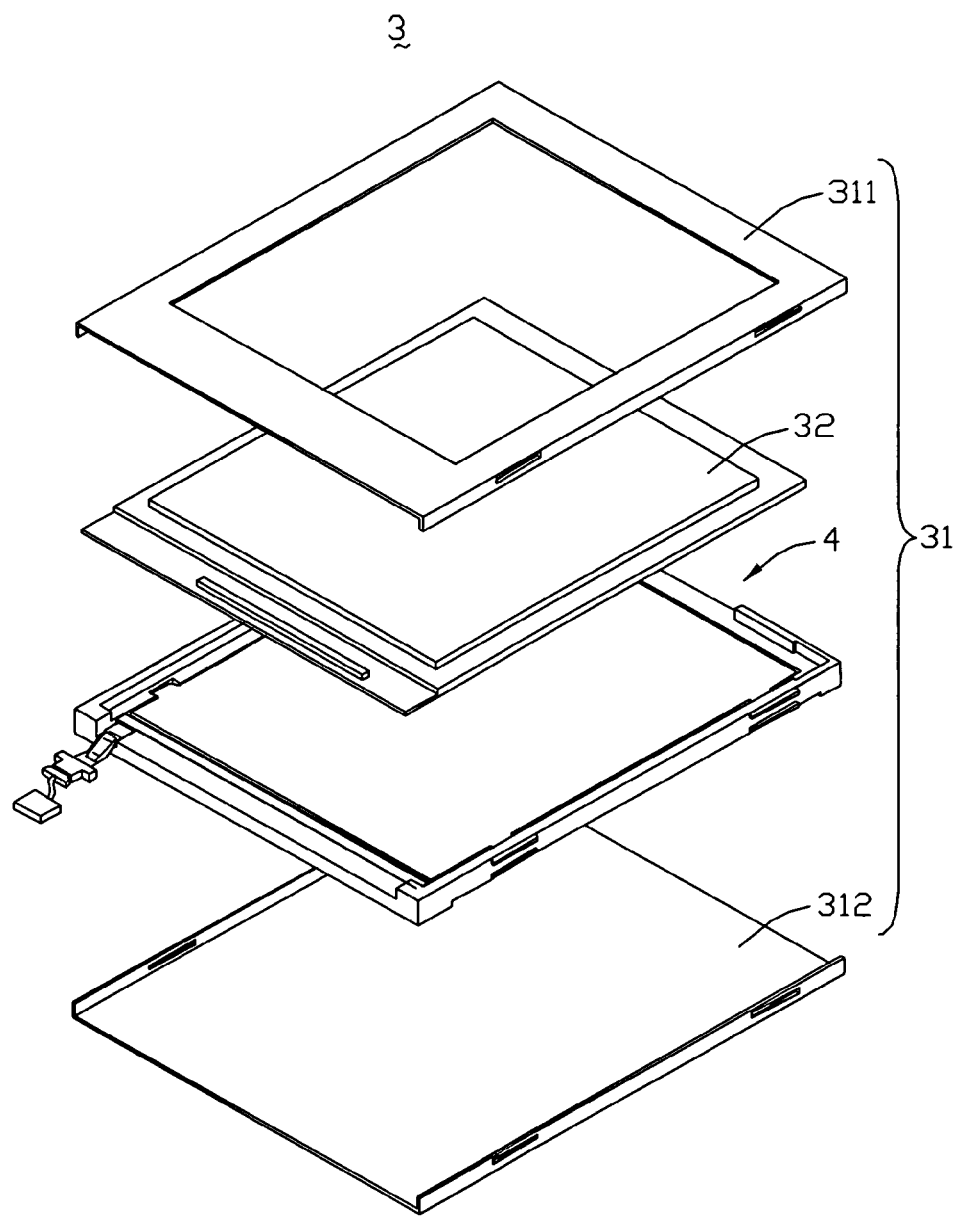
FIG. 3 is an exploded, isometric view of a liquid crystal display according to a second embodiment of the present invention, the liquid crystal display including a backlight module.

Referring to FIG. 3, a liquid crystal display 3 according to a second embodiment of the present invention is shown. The liquid crystal display 3 is similar to the liquid crystal display 1 of the first embodiment. The liquid crystal display 3 includes a backlight module 4, a bezel 31 and a liquid crystal panel 32 adjacent to the backlight module 4. The bezel 31 includes an upper bezel 311 and a lower bezel 312 which cooperatively form a space to accommodate the liquid crystal panel 32 and the backlight module 4.

Figure 4:
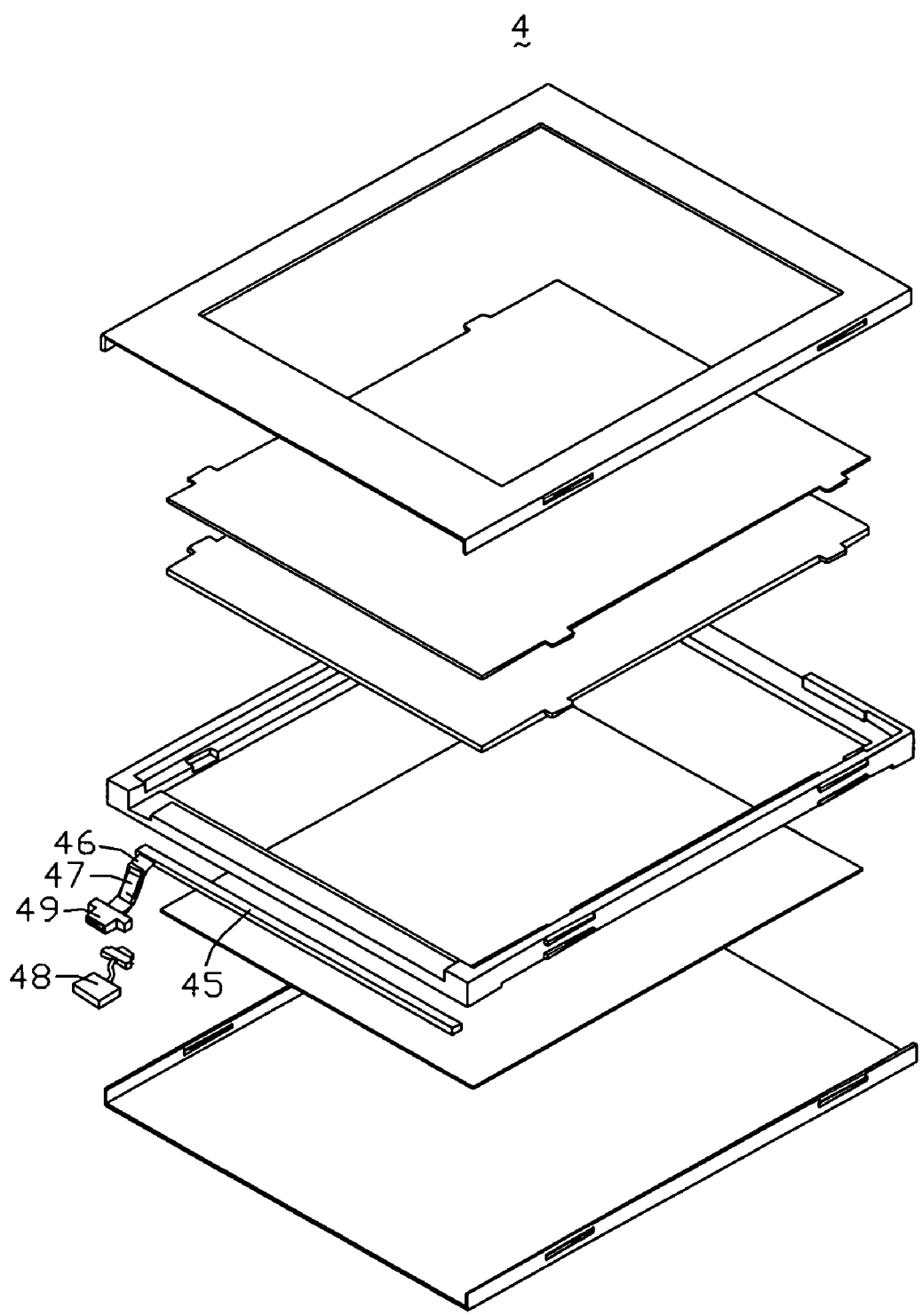
FIG. 4 is an exploded, isometric view of the backlight module of FIG. 3.
Figure 5:
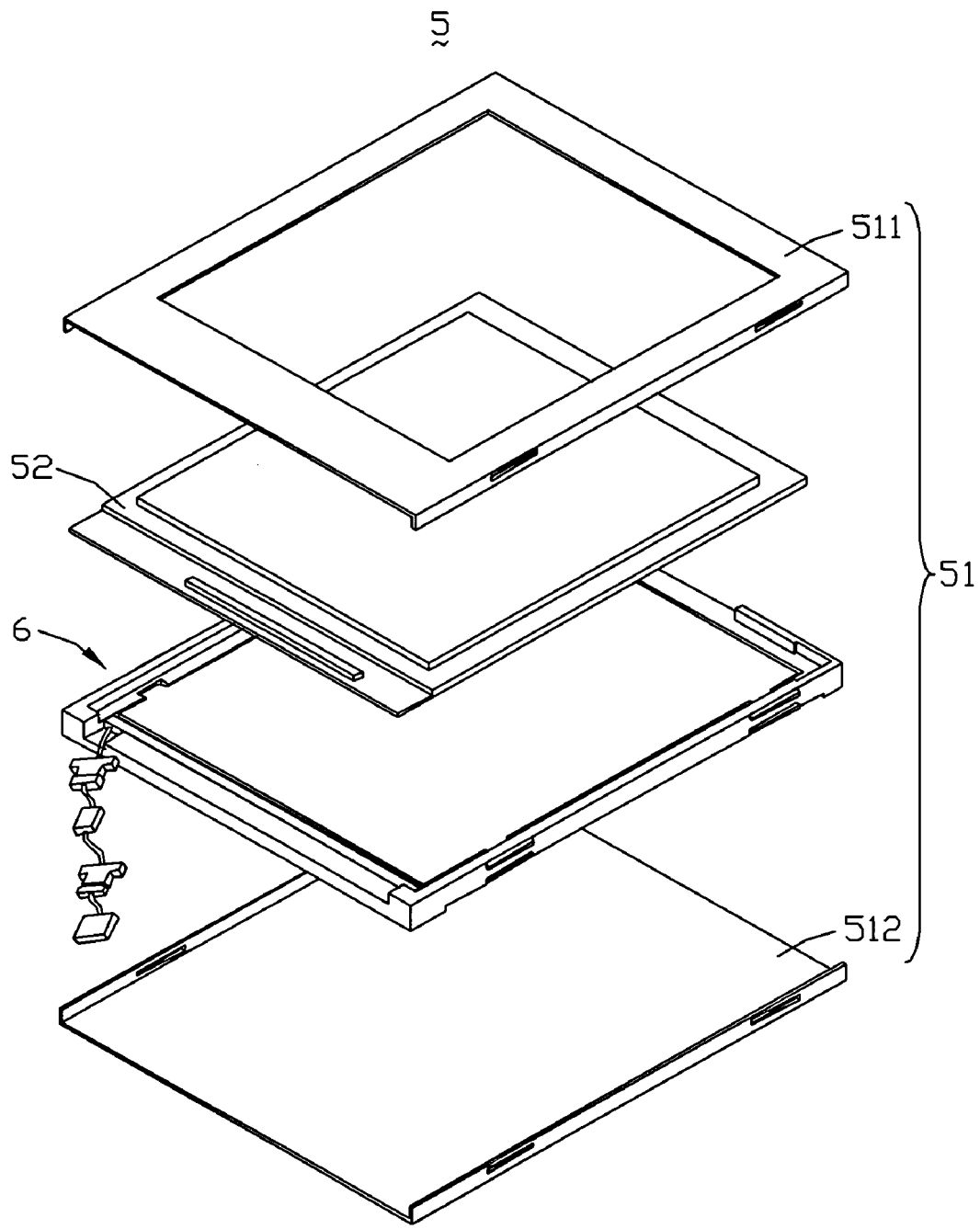
FIG. 5 is an exploded, isometric view of a conventional liquid crystal display, the liquid crystal display including a backlight module.
Figure 6:
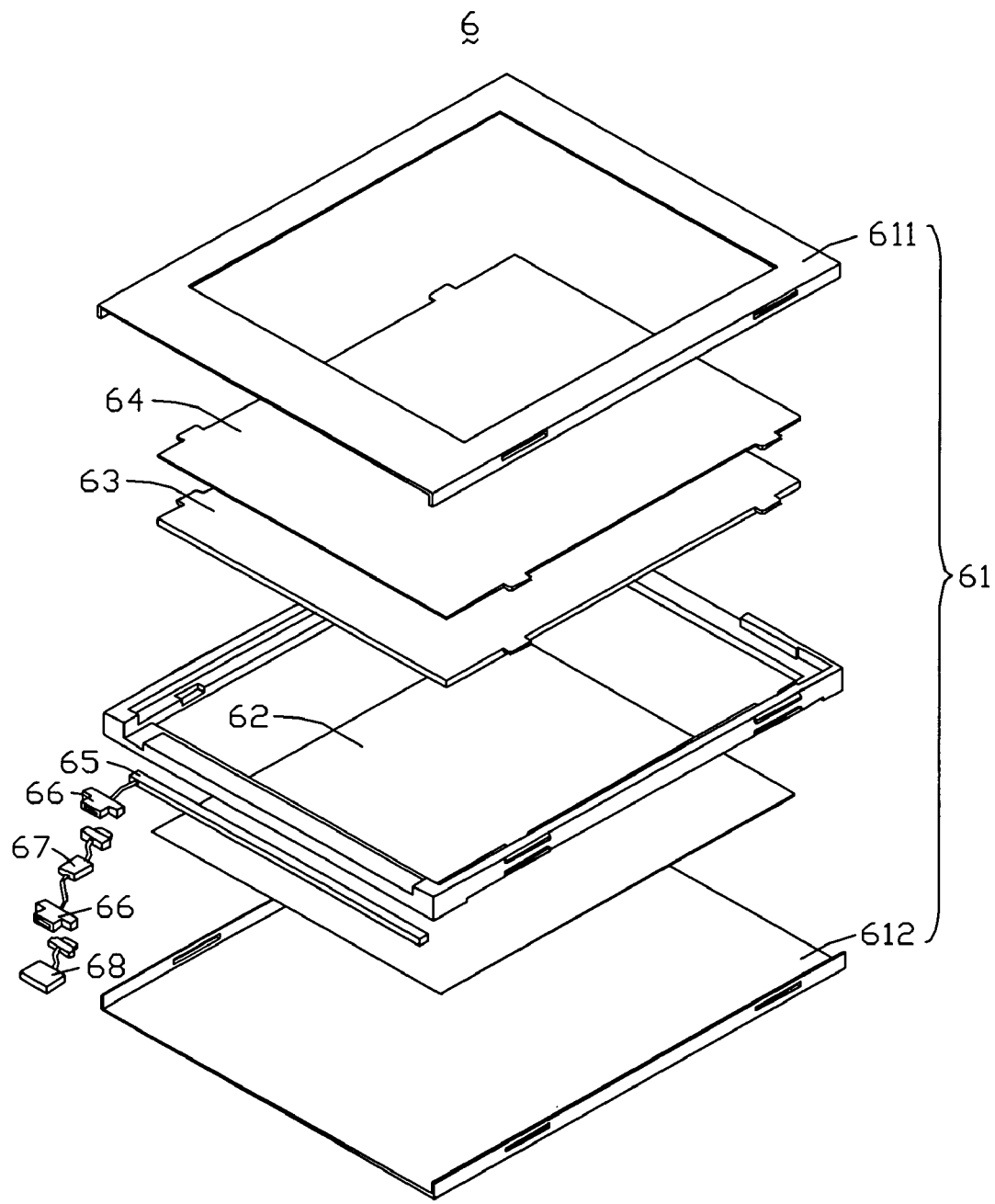
FIG. 6 is an exploded, isometric view of backlight module of FIG. 5.

Referring to FIG. 4, the backlight module 4 of the liquid crystal display 3 includes a flexible printed circuit 46. A light source driver 47 is disposed on a surface of the flexible printed circuit 46, and is received in a frame 41. The light source driver 47 is electrically connected with a light source 45 via the flexible printed circuit 46. The light source driver 47 is electrically connected with an input circuit 48 via a connector 49.

Unlike with a conventional liquid crystal display, the light source drivers 27, 47 of the liquid crystal displays 1, 3 according to the present invention are directly electrically connected with the light sources 25, 45, and are received in the frame 21, 41. The light source drivers 27, 47 are also accommodated in the frame 21, 41. Thus, an electrically connections of the light source driver 27, 47 and the light source 25, 45 are reliable. Furthermore, the liquid crystal displays 1, 3 do not need a connector to electrically connect the light sources 25, 45 with the light source drivers 27, 47, thus an assembling process thereof are simplified, and costs thereof are reduced.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
   a light guide plate;
   a light source provided adjacent to the light guide plate;
   a light source driver connected with the light source;
   a frame comprising an upper frame and a lower frame, the frame forming a space to entirely accommodate the light guide plate, the light source, and the light source driver;
   a flexible printed circuit, the light source driver being provided on the flexible printed circuit; and
   a connector provided outside the frame, the connector being electrically connected with the light source driver via the flexible printed circuit.

2. A backlight module comprising:
   a light guide plate;
   a light source provided adjacent to the light guide plate;
   a light source driver provided adjacent to the light guide plate and electrically connected with the light source;
   a frame configured for entirely accommodating the light guide plate, the light source, and the light source driver, the frame comprising a plastic frame defining a concave; and
   a flexible printed circuit
   wherein the light source driver is provided on the flexible printed circuit, and the concave entirely receives the light source driver.

3. A liquid crystal display comprising a liquid crystal panel, a backlight module facing the liquid crystal panel, and a bezel accommodating the liquid crystal panel and the backlight module, the backlight module comprising:
   a light guide plate;
   a light source provided adjacent to the light guide plate;
   a light source driver provided adjacent to the light guide plate and electrically connected with the light source;
   a frame comprising an upper frame and a lower frame, the frame forming a space to entirely accommodate the light guide plate, the light source, and the light source driver;
   a flexible printed circuit, the light source driver being provided on the flexible printed circuit; and
   a connector provided outside the frame, the connector being electrically connected with the light source driver via the flexible printed circuit.

4. The liquid crystal display as claimed in claim 3, wherein the backlight module further comprises an input circuit, the input circuit being electrically connected with the light source driver via the connector.

* * * * *